(12) United States Patent
Sendrea

(10) Patent No.: US 7,320,387 B2
(45) Date of Patent: Jan. 22, 2008

(54) LOAD ADAPTIVE DAMPER WITH TRANSIENT AIR SIGNAL RESTRICTOR

(75) Inventor: Darryl Sendrea, Brampton (CA)

(73) Assignee: ArvinMeritor Technology, LLC, Troy, MI (US)

( * ) Notice: Subject to any disclaimer, the term of this patent is extended or adjusted under 35 U.S.C. 154(b) by 168 days.

(21) Appl. No.: 11/100,724

(22) Filed: Apr. 6, 2005

(65) Prior Publication Data

US 2006/0226587 A1    Oct. 12, 2006

(51) Int. Cl.
*F16F 9/48* (2006.01)
(52) U.S. Cl. .................... 188/285; 188/313; 267/64.22
(58) Field of Classification Search ............. 188/266.2, 188/278, 285, 284, 313, 322.15; 267/64.18, 267/64.22
See application file for complete search history.

(56) References Cited

U.S. PATENT DOCUMENTS

| | | | |
|---|---|---|---|
| 3,378,110 A | | 4/1968 | Parrish, Jr. |
| 4,153,237 A | * | 5/1979 | Supalla ..................... 267/64.15 |
| 4,534,580 A | | 8/1985 | Kobayashi et al. |
| 4,660,689 A | | 4/1987 | Hayashi et al. |
| 4,793,450 A | | 12/1988 | Savenije |
| 4,934,667 A | | 6/1990 | Pees et al. |
| 5,097,929 A | | 3/1992 | Spoto |
| 5,180,144 A | | 1/1993 | Hellyer et al. |
| 5,518,090 A | | 5/1996 | Miller et al. |
| 5,522,221 A | | 6/1996 | Kadlicko et al. |
| 5,542,509 A | | 8/1996 | Bell |
| 5,556,082 A | | 9/1996 | Takasaki |
| 5,572,425 A | | 11/1996 | Levitt et al. |
| 5,615,756 A | | 4/1997 | Grundei et al. |
| 5,725,239 A | | 3/1998 | de Molina |
| 5,810,128 A | | 9/1998 | Eriksson et al. |
| 5,860,498 A | | 1/1999 | Pradel |

(Continued)

FOREIGN PATENT DOCUMENTS

DE        41 03 356 C1    6/1992

(Continued)

OTHER PUBLICATIONS

European Search Report, mailed Jul. 25, 2006.

*Primary Examiner*—Devon Kramer
(74) *Attorney, Agent, or Firm*—Carlson, Gaskey & Olds

(57) ABSTRACT

A shock absorber for a vehicle suspension includes a pneumatic actuator that is fluidly connected to a compressed air source in the vehicle suspension, such as a suspension air bag. The pneumatic actuator cooperates with an adjustment mechanism housed within the shock absorber to adjust damping. The shock absorber includes a main rod that supports a piston for axial movement within a cylinder body. The piston separates the cylinder body into first and second fluid chambers. The adjustment mechanism includes an adjustment rod that is received within an axial bore formed within the main rod. The adjustment rod is axially moved within the axial bore by the pneumatic actuator to uncover and cover a plurality of bores that are in fluid communication with at least one of the first and second fluid chambers. The pneumatic actuator includes a plunger having a tapered surface that engages the adjuster rod to move the adjuster rod in a desired direction to adjust damping. A fitting and a restrictor plug cooperate to fluidly connect the pneumatic actuator to the compressed air source and to meter air flow to attenuate pressure spikes.

18 Claims, 4 Drawing Sheets

U.S. PATENT DOCUMENTS

| | | |
|---|---|---|
| 5,862,895 A | 1/1999 | Ricard |
| 5,934,422 A | 8/1999 | Steed |
| 5,996,982 A | 12/1999 | Bell |
| 6,015,155 A | 1/2000 | Brookes et al. |
| 6,053,437 A * | 4/2000 | Hansinger et al. .......... 239/703 |
| 6,092,632 A | 7/2000 | Popjoy et al. |
| 6,112,868 A | 9/2000 | Graham et al. |
| 6,120,009 A | 9/2000 | Gatehouse et al. |
| 6,155,391 A | 12/2000 | Kashiwagi et al. |
| 6,164,665 A | 12/2000 | Lentz et al. |
| 6,206,351 B1 | 3/2001 | Hamada et al. |
| 6,213,262 B1 | 4/2001 | Bell |
| 6,254,067 B1 * | 7/2001 | Yih ......................... 267/64.22 |
| 6,279,703 B1 * | 8/2001 | Mete ....................... 188/319.1 |
| 6,286,642 B1 * | 9/2001 | Yi ........................... 188/319.2 |
| 6,450,304 B1 | 9/2002 | Miller et al. |
| 6,637,555 B2 * | 10/2003 | Miller et al. ............. 188/266.5 |
| 6,651,964 B2 * | 11/2003 | Hugdahl ................... 267/64.22 |
| 6,725,983 B2 | 4/2004 | Bell |
| 6,938,887 B2 * | 9/2005 | Achenbach ............... 267/64.22 |
| 2003/0052469 A1 * | 3/2003 | Bell ..................... 280/124.157 |

FOREIGN PATENT DOCUMENTS

| | | | |
|---|---|---|---|
| DE | 4103356 | * | 6/1992 |
| DE | 195 29 072 A | | 2/1997 |
| EP | 0 565 832 A1 | | 2/1993 |
| EP | 1 096 171 A2 | | 7/2000 |
| EP | 1 293 366 A | | 3/2003 |
| GB | 1 415 608 A | | 11/1975 |

\* cited by examiner

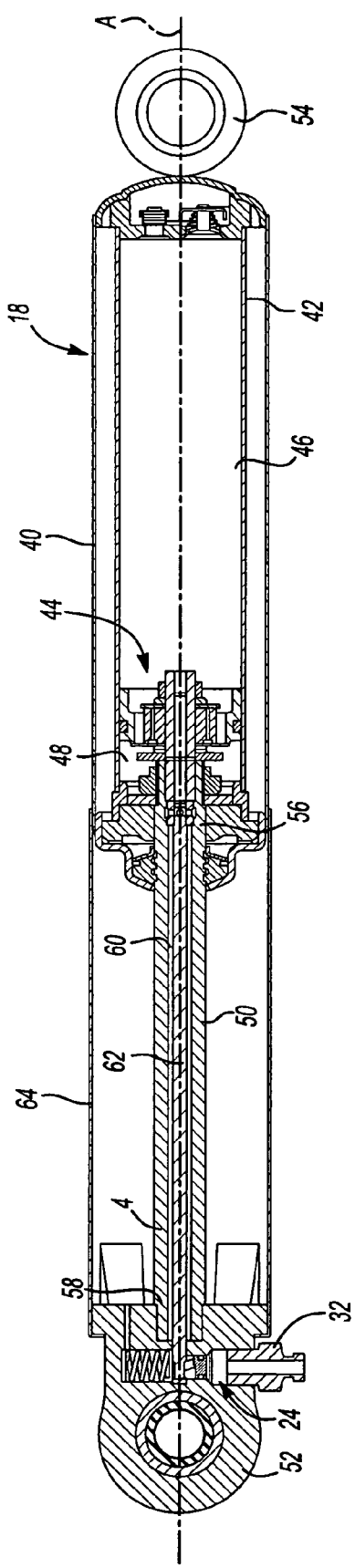
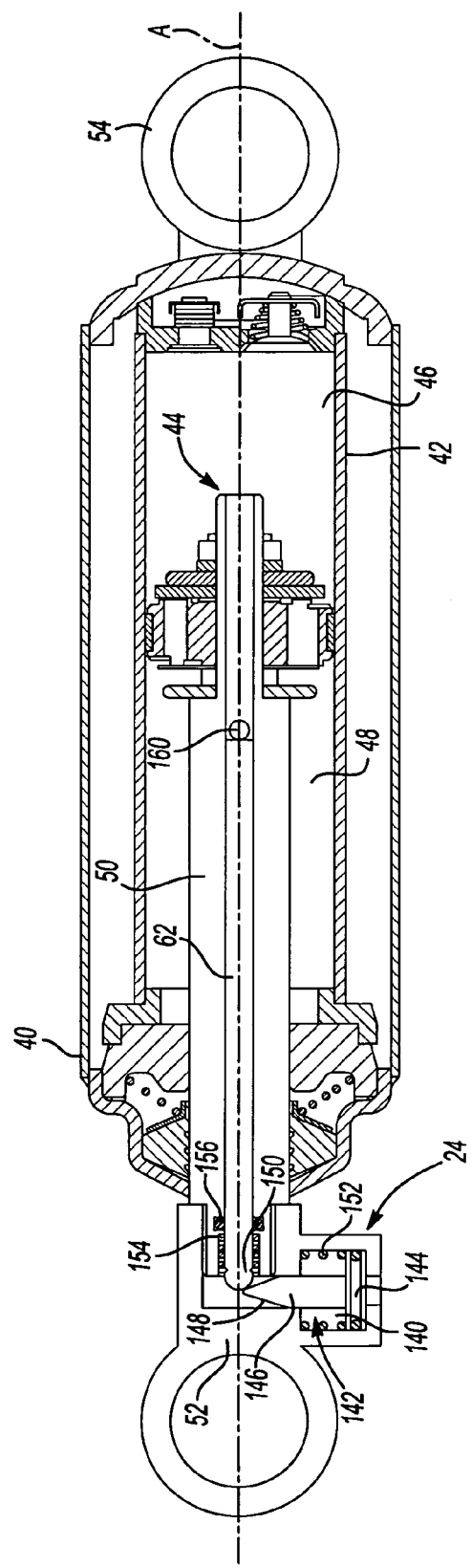

LOAD ADAPTIVE DAMPER WITH TRANSIENT AIR SIGNAL RESTRICTOR

TECHNICAL FIELD

The subject invention is directed to a shock absorber assembly including an adjustment mechanism for adjusting damping characteristics, which is controlled by an actuator with a restrictor that meters air flow from a compressed air source.

BACKGROUND OF THE INVENTION

Air suspensions include numerous air springs and shock absorbers that are used to improve vehicle ride characteristics by accommodating variations in road surfaces. Air suspensions are common in high load capacity applications, such as heavy-duty line haul applications for example, where cargo loads can vary significantly. Significant load variations can adversely affect ride quality.

Various attempts have been made to provide a variable suspension response by modifying performance of the shock absorbers or air springs depending on vehicle or road conditions. Ride control and height control systems have traditionally been used to provide a variable suspension response. Some ride control systems provide various degrees of damping and spring rate adjustment to compensate for loaded and empty vehicle conditions. Height control systems monitor and control air spring pressures to maintain a desired ride height. These height control systems actively adjust ride height by supplying or releasing air from the air springs.

With either the ride control or height control systems, air is cycled into and out of the air springs. This cycle of varying air spring pressure has often been utilized to activate a shock absorber adjusting device, to further compensate for ride quality variation by adjusting shock absorber damping. Current adjustment systems utilize a hollow rod that is coupled to a piston received within the shock absorber. An internal valve assembly is positioned within the hollow rod adjacent to the piston. An air pressure signal is communicated from the air springs to an internal valve assembly through the hollow rod to adjust damping or lock movement of the shock absorber.

The internal valve assembly defines an effective area on which the air pressure signal can act. Due to the position of the internal valve assembly within the hollow rod, this effective area is relatively small. This means that the force acting on the internal valve assembly is not always adequate to overcome valve seal friction and often cannot hold a desired valve setting. Thus, there is a need for a pneumatic actuator for a shock absorber adjustment mechanism that can more effectively and efficiently control damping adjustment, as well as overcoming the other above-mentioned deficiencies in the prior art.

SUMMARY OF THE INVENTION

A shock absorber includes an adjustment mechanism that adjusts damping forces within the shock absorber in response to predetermined input conditions. A pneumatic actuator controls movement of the adjustment mechanism. The pneumatic actuator is fluidly connected to a pressurized air source with a fitting assembly that meters air flow to attenuate pressure spikes.

In one example, the shock absorber is used in a vehicle suspension system that includes at least one suspension air bag. The suspension air bag is pressurized and thus provides a compressed air source for the pneumatic actuator. The fitting assembly includes a main fitting body that fluidly connects an end mount of the shock absorber to the compressed air source. The main fitting body has an inner bore that is defined by an inner diameter. A restrictor plug is received within the inner bore and is defined by an outer diameter. The main fitting body and the restrictor plug cooperate to provide a reduced area flow passage that is defined between the outer diameter of the restrictor plug and the inner diameter of the main fitting body. This reduced area flow passage meters air flow from the compressed air source to the adjustment mechanism and attenuates air pressure spikes resulting from suspension travel.

In one example, the shock absorber includes a main rod that supports a piston for axial movement within a cylinder body. The piston separates the cylinder body into first and second fluid chambers. The adjustment mechanism includes an adjustment rod that is received within an axial bore formed within the main rod. The adjustment rod is axially moved within the axial bore by the pneumatic actuator to uncover and cover a plurality of radial holes that are in fluid communication with at least one of the first and second fluid chambers.

The pneumatic actuator includes a plunger having at least one tapered surface that engages the adjuster rod to move the adjuster rod in a desired direction. At least one spring resiliently biases the plunger to a soft, or lower damping force, position. In one example, the plunger includes a pair of legs with opposing tapered surfaces. The opposing tapered surfaces cooperate with the adjuster rod to move the adjuster rod back and forth within the main rod between soft and hard damping positions. In another example, the plunger comprises a conical body that cooperates with the adjuster rod to move the adjuster rod from a soft position to a hard position. In this example, another spring is required to resiliently bias the adjuster rod to the soft position.

The subject invention provides a pneumatic actuator for a shock absorber adjustment mechanism that more effectively and efficiently controls damping adjustment by metering air flow to the pneumatic actuator. Further, the pneumatic actuator exposes an increased effective area to a pressurized air source to ensure that forces acting on a piston valve assembly are adequate to overcome valve seal friction and can hold a desired valve setting. In addition, the angular relationship between the pneumatic actuator and the adjuster rod provides a mechanical advantage to the pneumatic actuator that favors the plunger moving the adjuster rod, but wherein the adjuster rod cannot move the plunger. These and other features of the present invention can be best understood from the following specification and drawings, the following of which is a brief description.

BRIEF DESCRIPTION OF THE DRAWINGS

FIG. 2 is a cross-sectional view of a shock absorber designed according to the subject invention.

FIG. 7 is a cross-sectional view of a shock absorber designed according to another embodiment of the subject invention.

DETAILED DESCRIPTION OF THE PREFERRED EMBODIMENT

Figure 1:
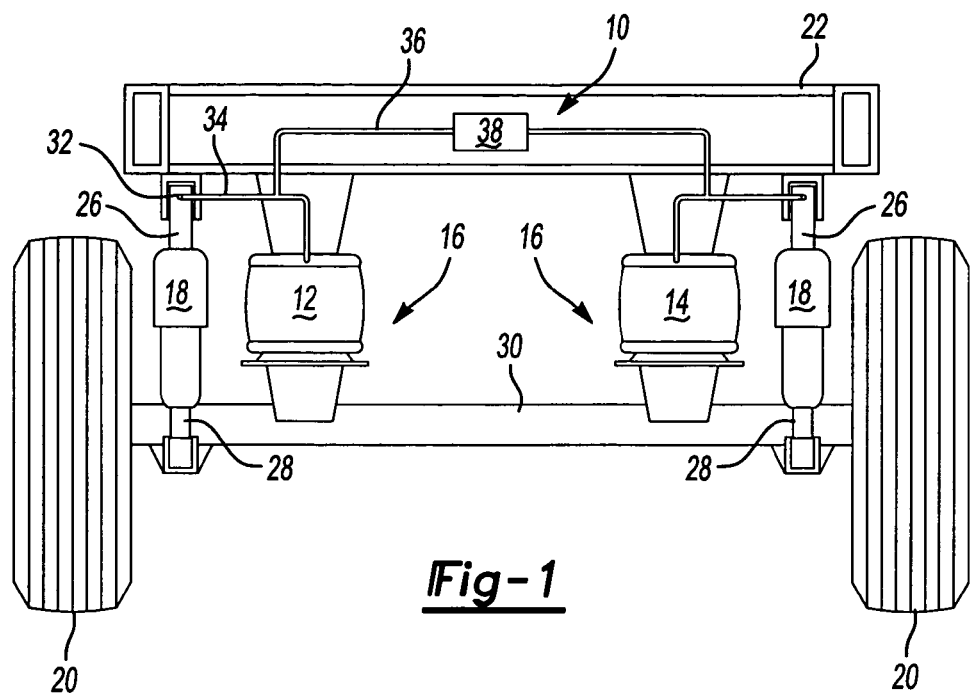
FIG. 1 schematically illustrates a vehicle suspension assembly incorporating the subject invention.

A vehicle suspension assembly 10 includes air springs 12, 14 that are supported on a suspension arrangement 16 in a conventional manner. The air springs 12, 14 are pressurized with air in a known manner. Shock absorbers 18 provide further damping to absorb relative movement between vehicle wheels 20 and a vehicle body structure 22.

Each of the shock absorbers 18 includes the ability to provide adjustable damping that is responsive to changes in loading on the vehicle body structure 22. The adjustment is controlled by a pneumatic actuator 24, see FIG. 2, which is fluidly connected by an air coupling or fitting 32 to a pressurized air source. Preferably, the pressurized air source comprises at least one of the air springs 12, 14.

One end 26 of the shock absorber 18 is connected with the vehicle body structure 22 while an opposite end 28 is connected with an appropriate portion of an axle assembly 30. The vehicle body structure 22 comprises the sprung mass and the axle assembly 30 comprises the unsprung mass. The fitting 32 is secured to the one end 26 of the shock absorber 18. An air hose or conduit 34 couples the fitting 32 with an air supply 36 that couples a leveling valve or an air pressure source 38 with the air springs 12, 14. Pressurized air from the air springs 12, 14 is communicated to the pneumatic actuator 24 to adjust damping forces within the shock absorber 18. This will be discussed in greater detail below.

One example of the shock absorber 18 is shown in FIG. 2. The shock absorber 18 includes an outer cylinder 40 and an inner cylinder 42 having one end portion received within the outer cylinder 40. A piston assembly 44 is received within the inner cylinder 42 and separates the shock absorber 18 into a compression chamber 46 and a rebound chamber 48. The piston assembly 44 is coupled to a main rod 50 that extends into the outer cylinder 40. The main rod 50 defines an axis A along which the main rod and piston assembly 44 move to achieve damping.

The main rod 50 has a first rod end mount 52 that is coupled to the vehicle body structure 22. The outer cylinder 40 has a second rod end mount 54 that is coupled to the vehicle wheel 20. The main rod 50 has a first rod end portion 56 that is coupled to the piston assembly 44 and a second rod end portion 58 that extends into the first rod end mount 52. The main rod 50 includes an axial bore 60 that extends along a length of the main rod 50.

An adjuster rod 62 is received within the axial bore 60. Movement of the adjuster rod 62 is controlled by the pneumatic actuator 24. The adjuster rod 62 cooperates with the piston assembly 44 and main rod 50 to adjust damping in response to variations in loading on the vehicle. This will be discussed in greater detail below. An optional dust tube 64 can also be utilized on the shock absorber 18. The dust tube 64 protects the main rod 50 from being impacted by external debris. An interface between the adjuster rod 62 and piston assembly 44 is shown in greater detail in FIG. 3. The piston assembly 44 includes a piston 66 that engages an inner surface of the inner cylinder 42. A seal 68 surrounds the piston 66 to prevent leaking between the rebound 48 and compression 46 chambers. The piston 66 is supported on a piston rod adapter 70 that is secured to the main rod 50. The piston 66 includes a plurality of passages 72 that extend between the compression chamber 46 and the rebound chamber 48.

At least one recoil disc 74 is positioned on a compression side of the piston 66. A washer 76 and nut 78 hold the recoil disc 74 against the compression side of the piston 66. At least one compression disc 80 is positioned on a rebound side of the piston 66. A top-out washer 82 is positioned between an end of the main rod 50 and the compression disc 80. A plurality of shims 84 is positioned between the compression disc 80 and the top-out washer 82. The top-out washer 82 and shims 84 cooperate to provide a compression disc limiter.

The recoil disc 74 and compression disc 80 operate in a known manner and cooperate with the passages 72 in the piston 66 to control damping. Fluid flows through the passages 72 and across the recoil 74 and compression 80 discs to provide the damping. In addition to preventing leaking, the seal 68 ensures correct oil flow through the piston 66, passages 72, and across the recoil 74 and compression 80 discs.

An inner cylinder head 86 is coupled to one end of the main rod 50. The inner cylinder head 86 includes a cylinder head adapter 88 that couples the inner cylinder head 86 to the inner cylinder 42. The cylinder head adapter 88 can be a separate component or can be formed with the inner cylinder head 86 as one-piece. The inner cylinder head 86 provides a rod guide bearing surface. A nut 90 is used to secure a top-out washer 92 against the inner cylinder head 86. The nut 90 is threaded onto the main rod 50. The top-out washer 92 serves as a restrictor that defines a limit for movement of the main rod 50, but also provides hydraulic cushioning at full extension as top-out washer 92 engages with the cylinder head adapter 88.

The inner cylinder head 86 is received within an intermediate cylinder head 94. A seal 96 is positioned between an inner surface of the intermediate cylinder head 94 and an outer surface of the main rod 50 and is held in place with a first retainer 98.

The piston rod adapter 70 includes a plurality of radial holes 102 (only one is shown) that are covered and uncovered by the adjuster rod 62 to adjust damping. Preferably, there are four (4) radial holes 102, however, more or less holes could be utilized. The adjuster rod 62 moves back and forth along a linear path within the axial bore 60. As discussed above, axial movement of the adjuster rod 62 is controlled by the pneumatic actuator 24.

Figure 4:
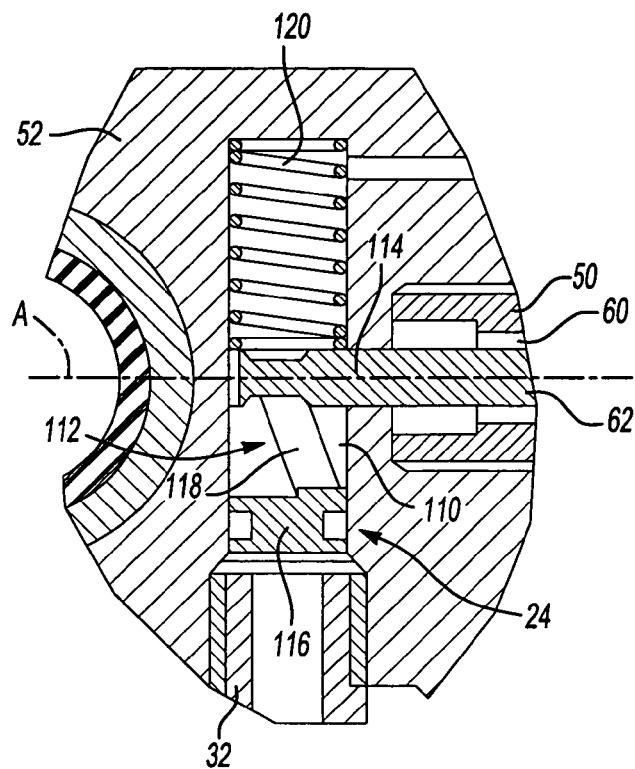
FIG. 4 illustrates other selected features of FIG. 2 in greater detail.

The pneumatic actuator 24 is shown in greater detail in FIG. 4. The first rod end mount 52 includes a cavity 110 that receives the fitting 32. The pneumatic actuator 24 includes a plunger 112 that cooperates with one end 114 of the adjuster rod 62 to move the adjuster rod 62 in an axial direction along axis A. In the embodiment shown in FIG. 4, the plunger 112 includes a base piston portion 116 and an extension body member 118 extending out from the base piston portion 116 toward the adjuster rod 62. A preloaded return spring 120 resiliently biases the plunger 112 in a soft or low damping position.

Figure 5:
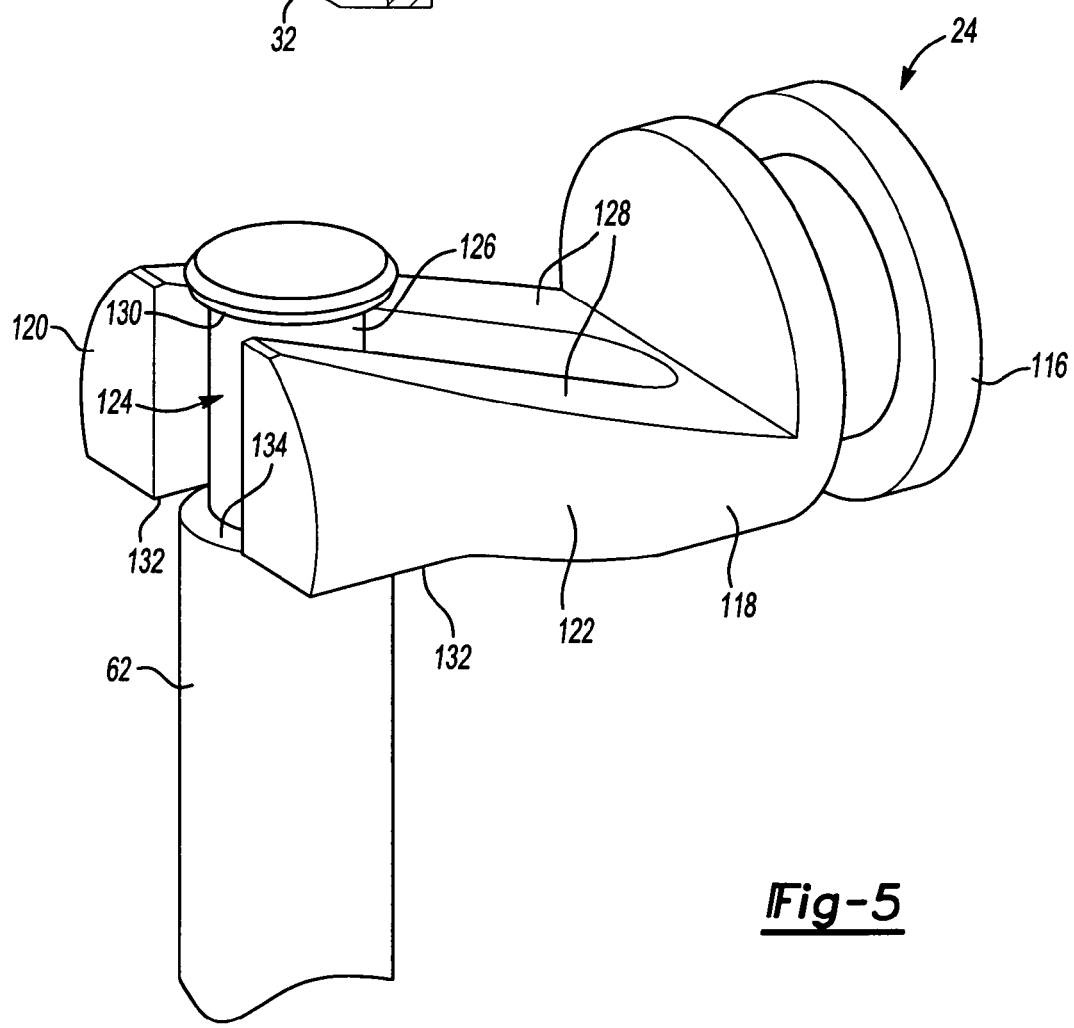
FIG. 5 illustrates selected features of FIG. 4 in greater detail.
Figure 6:
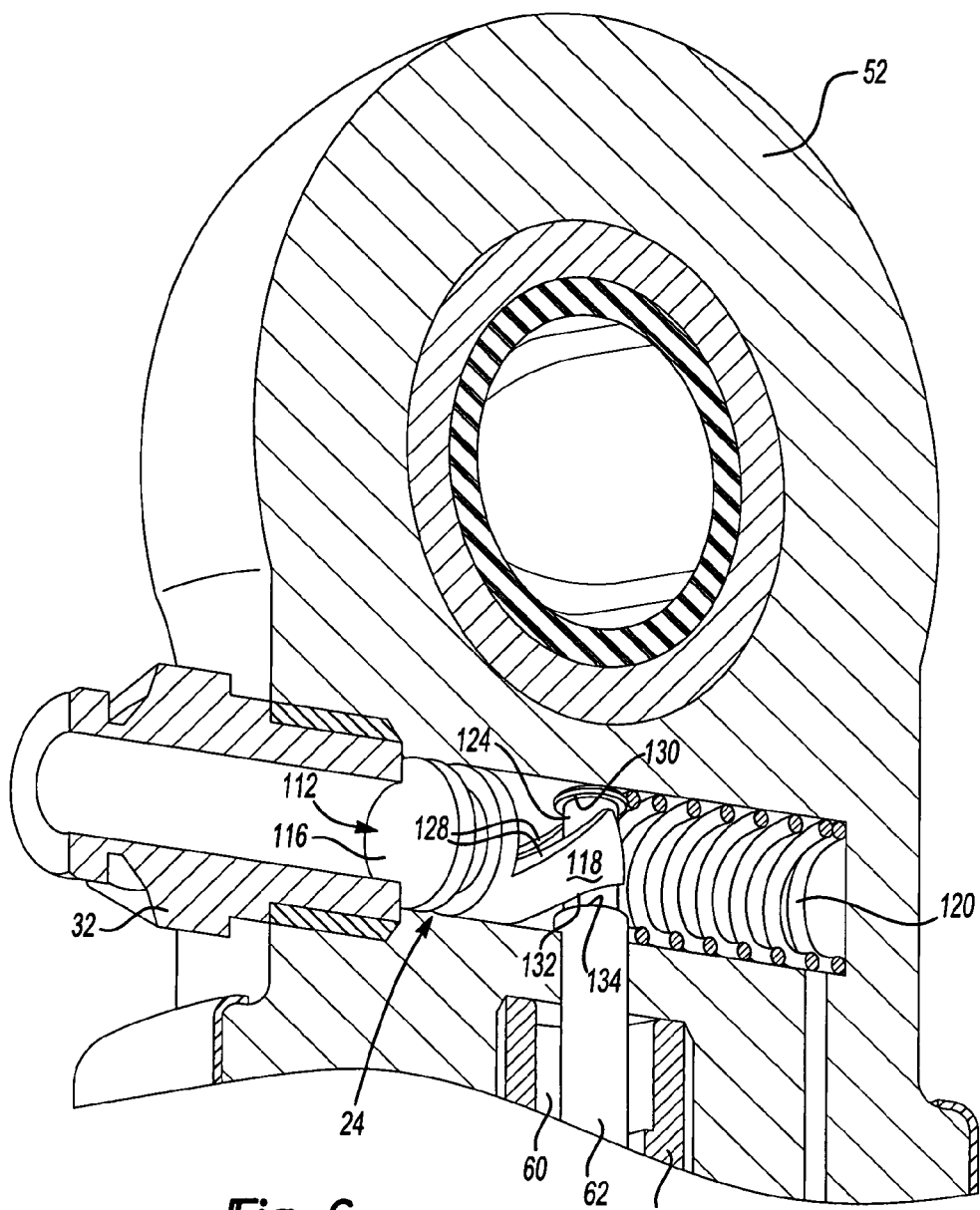
FIG. 6 is a perspective view, shown in partial cross-section, of the features shown in FIG. 4.

As shown in FIGS. 5 and 6, the extension body member 118 includes first 120 and second 122 legs that are separated by a recess 124. The adjuster rod 62 is received in the recess 124. The adjuster rod 62 includes a groove 126 in which the first 120 and second 122 legs engage. Each of the first 120 and second 122 legs includes a first tapered surface 128 that engages a first adjuster rod surface 130 to move the adjuster rod 62 in a first axial direction. Each of the first 120 and second 122 legs also includes a second tapered surface 132 that engages a second adjuster rod surface 134 to move the adjuster rod 62 in a second axial direction opposite from the first axial direction. In this configuration, the plunger 112 can bi-directly control axial movement of the adjuster rod 62. This eliminates the need for an adjuster rod return spring.

Figure 3:
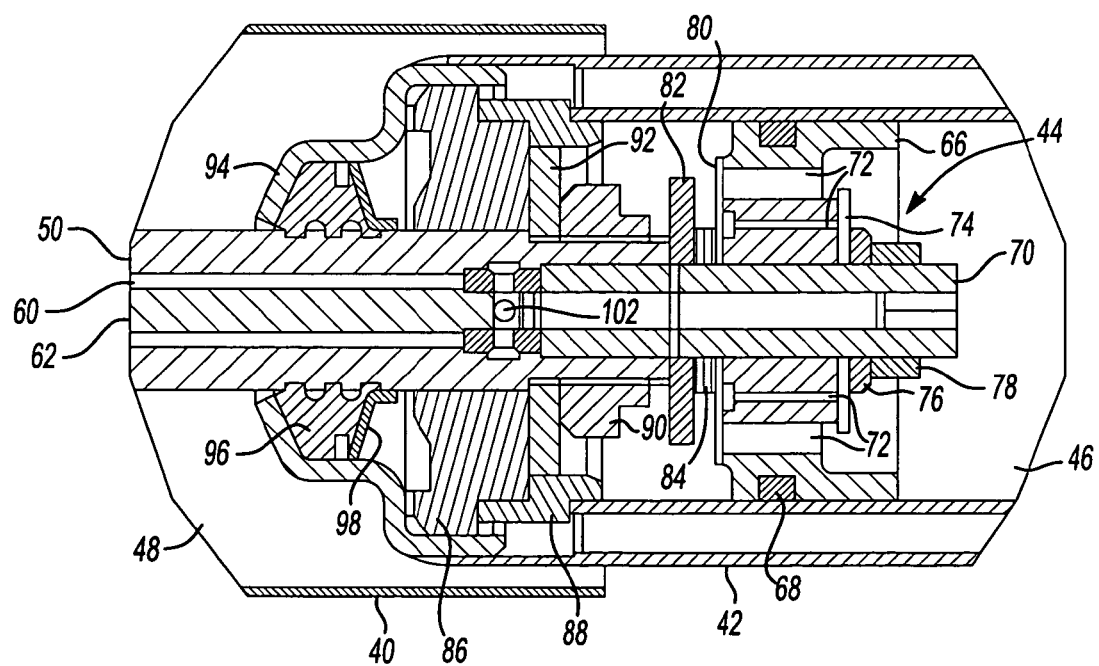
FIG. 3 illustrates selected features of FIG. 2 in greater detail.

As the plunger 112 moves the adjuster rod 62 within the axial bore 60, the radial holes 102 in the piston rod adaptor 70 are covered and uncovered to adjust damping, see FIG. 3. For example, if there is an increase in load on the vehicle, there is a corresponding increase in pressure in the air springs 12, 14. This increases pressure at the fitting 32 to increase damping, i.e. increase stiffness of the shock absorber 18, actuating the plunger 112 to move the adjuster rod 62 further into the main rod 50. In other words, the adjuster rod 62 is pushed by the plunger 112 in an axial direction toward the vehicle wheel 20, which causes the radial holes 102 to be covered, which increases damping. When vehicle loading is decreased, pressure in the air springs 12, 14 decreases and the plunger 112 moves the adjuster rod 62 in a direction away from the vehicle wheel 20 to uncover the radial holes 102 and decrease damping.

Another example of a pneumatic actuator 24 is shown in FIG. 7. In this example, the first rod end mount 52 includes a cavity 140 that receives a plunger 142. The plunger 142 includes a main piston base 144 and a body member 146 extending out from the main piston base 144 toward the adjuster rod 62. The body member 146 includes a tapered surface 148 that cooperates with an end portion 150 of the adjuster rod 62 to move the adjuster rod 62 in an axial direction along axis A. Preferably, the body member 146 has a conical shape.

The plunger 142 in this example is biased in the soft position by a first return spring 152. The adjuster rod 62 is biased in the soft position by a second return spring 154. The adjuster rod 62 is sealed below the second return spring 154 with a seal 156 to prevent leakage. The second return spring 154 is shown at a top portion of the adjuster rod 62, however, the second return spring 154 could optionally be positioned at a bottom portion of the adjuster rod 62.

In this configuration, the main rod 50 includes a plurality of radial holes 160 (only one is shown) that are covered and uncovered by the adjuster rod 62 to adjust damping. As the plunger 142 moves the adjuster rod 62 within the axial bore 60, the radial holes 160 are covered and uncovered. If there is an increase in load on the vehicle, there is a corresponding increase in pressure in the air springs 12, 14. This increases stiffness of the shock absorber 18 by actuating the plunger 142 to move the adjuster rod 62 further into the main rod 50 to cover the radial holes 160. When vehicle loading is decreased, pressure in the air springs 12, 14 decreases and the adjuster rod 62 moves away from the vehicle wheel 20 to uncover the radial holes 160 and decrease damping.

It should be understood that the pneumatic actuator 24 of FIG. 7 could also be used with the piston rod adaptor configuration shown in FIG. 2. Also, the pneumatic actuator 24 of FIG. 2 could be used with the main rod configuration shown in FIG. 7. Also, the dust tube 64 shown in the configuration of FIG. 2 could also optionally be used in the configuration of FIG. 7.

Figures 8, 9:
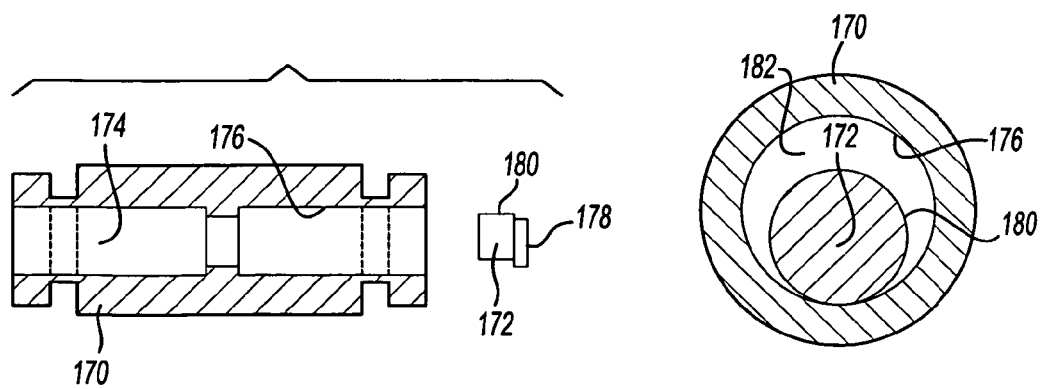
FIG. 8 is an exploded view of a union fitting and restrictor designed according to the subject invention.
FIG. 9 is a cross-sectional view of the union fitting and restrictor in an assembled condition.

In any of the combinations, a union fitting 170 and restrictor 172 are used to meter air flow, see FIGS. 8 and 9. The union fitting 170 fluidly connects the fitting 32 to the compressed air source, i.e. the air springs 12,14. The union fitting 170 includes an internal bore 174 that is defined by an inner surface 176 having an inner diameter.

The restrictor 172 comprises a solid plug that is received within the internal bore 174. The restrictor 172 includes a lip portion 178 that holds the restrictor 172 in place within the internal bore 174. The restrictor 172 is defined by an outer surface 180 having a diameter that is less than the inner diameter of the internal bore 174. This forms a reduced flow area 182 between the restrictor 172 and union fitting 170. Preferably, the restrictor 172 comprises a round plug. It should be understood that the restrictor 172 can float within the internal bore 174 during operation, such that an annular or ring-shaped flow passage extends completely around the restrictor 172. When the union fitting 170 is not pressurized, gravity will cause the restrictor 172 to settle to a position such as that shown in FIG. 9, for example.

This reduced flow area 182 provides a metered air flow through an annular area defined by an inner diameter of the union fitting 170 and an outer diameter of the restrictor 172. As the subject invention provides an adaptive system that responds and adjusts according to a steady-state air signal, a slightly delayed signal at the pneumatic actuator 24 is acceptable. Transient air spikes are virtually eliminated by using the restrictor 172 in the union fitting 170. Thus, air pressure spikes resulting from suspension travel are easily attenuated.

The adjuster rod 62 changes the damping forces by covering and uncovering radial holes 102, 160. Fluid flow is controlled by a piston assembly and disc valving as described above as the shock absorber moves between extended and collapsed positions. By opening and closing radial holes 102 a bypass is creased that changes rebound and compression damping simultaneously. FIG. 2 shows the shock absorber 18 in an extended position while FIG. 7 shows a collapsed position. It should be understood that the shock absorber of each configuration is movable between the collapsed and extended positions.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A shock absorber device comprising:
   a first cylinder;
   a second cylinder surrounding at least a portion of said first cylinder;
   a piston dividing said first cylinder into first and second chambers;
   a main rod supporting said piston for movement within said first cylinder, said main rod including a central bore extending axially along a length of said main rod;
   a piston rod adapter coupled to said piston, said piston rod adapter including a body portion extending into said central bore of said main rod, said body portion including a plurality of radial holes;
   an adjuster rod received within said central bore and having a first rod end portion extending toward said piston and a second rod end portion extending toward a rod end mount; and
   a pneumatic actuator cooperating with said second rod end portion to move said adjuster rod within said central bore to a desired adjuster rod position to adjust damping forces, said pneumatic actuator comprising a plunger having a base portion received within said rod end mount and a reduced body portion extending outwardly from said base portion toward said adjuster rod, wherein said pneumatic actuator adjusts damping forces by moving said adjuster rod to cover and uncover said plurality of radial holes.

2. The shock absorber device according to claim 1 including a spring resiliently biasing said plunger in a soft damping position, said spring being positioned within said rod end mount on an opposite side of said adjuster rod from said plunger.

3. The shock absorber device according to claim 1 wherein said reduced body portion comprises a conical body extending to a distal tapered tip that engages said second rod end portion.

4. The shock absorber device according to claim 1 including a fitting adapted to fluidly connect said rod end mount to a compressed air source, said fitting defining a conduit for directing air to said pneumatic actuator wherein compressed air flows through said conduit to exert a pressure force against said base portion to move said plunger toward said adjuster rod to move said adjuster rod in a direction into said first cylinder to increase damping.

5. The shock absorber device according to claim 4 including a restrictor positioned within said conduit to attenuate air pressure spikes by metering air flow through said fitting.

6. The shock absorber device according to claim 5 wherein said restrictor comprises a plug inserted within said fitting that defines an annular flow area between an outer diameter of said plug and an inner diameter of said fitting.

7. The shock absorber device according to claim 4 wherein the compressed air source comprises a suspension air spring.

8. A shock absorber device comprising:
a first cylinder;
a second cylinder surrounding at least a portion of said first cylinder;
a piston dividing said first cylinder into first and second chambers;
a main rod supporting said piston for movement within said first cylinder, said main rod including a central bore extending axially along a length of said main rod;
an adjuster rod received within said central bore and having a first rod end portion extending toward said piston and a second rod end portion extending toward a rod end mount; and
a pneumatic actuator wherein said pneumatic actuator comprises a plunger having a base portion received within said rod end mount and a reduced body portion extending outwardly from said base portion toward said adjuster rod and cooperating with said second rod end portion to move said adjuster rod within said central bore to a desired adjuster rod position to adjust damping forces wherein said reduced body portion comprises first and second legs separated by a recessed opening and wherein said second rod end portion of said adjuster rod is received within said recessed opening.

9. The shock absorber device according to claim 8 wherein said first and second legs each include a first tapered surface that engages said adjuster rod to move said adjuster rod in a first direction and a second tapered surface that engages said adjuster rod to move said adjuster rod in a second direction opposite from said first direction.

10. A shock absorber device comprising:
a first cylinder;
a second cylinder surrounding at least a portion of said first cylinder;
a piston dividing said first cylinder into first and second chambers;
a main rod supporting said piston for movement within said first cylinder, said main rod including a central bore extending axially along a length of said main rod;
an adjuster rod received within said central bore and having a first rod end portion extending toward said piston and a second rod end portion extending toward a rod end mount; and
a pneumatic actuator wherein said pneumatic actuator comprises a plunger having a base portion received within said rod end mount and a reduced body portion extending outwardly from said base portion toward said adjuster rod and cooperating with said second rod end portion to move said adjuster rod within said central bore to a desired adjuster rod position to adjust damping forces, and a first spring for biasing said plunger in a soft damping position and a second spring for biasing said adjuster rod in a soft damping position.

11. A pneumatic actuator for adjusting damping in a shock absorber comprising:
a plunger adapted for engagement with an adjuster rod received within a central bore of a main piston rod, said plunger being movable within a rod end mount that receives the main piston rod;
an actuator fitting secured to said rod end mount to provide a fluid connection to actuate said plunger;
a union fitting to fluidly connect said actuator fitting to a compressed air source, said union fitting including an internal bore defined by an inner diameter;
said plunger having a base end surface to face the compressed air source, said base end surface extending to a distal end surface that faces said adjuster rod, said distal end surface to directly engage a side surface of said adjuster rod, and wherein said distal end surface of said plunger comprises one of a pair of legs engageable within a groove formed within said adjuster rod and a conical tip that slides alone said side surface of said adjuster rod; and
a restrictor received within said internal bore and having an outer diameter wherein said restrictor defines a reduced flow passage area between said outer diameter and said inner diameter that attenuates air pressure spikes by metering air flow from the compressed air source to said plunger.

12. The pneumatic actuator according to claim 11 wherein the compressed air source comprises a suspension air spring.

13. The pneumatic actuator according to claim 11 wherein said plunger includes at least one tapered surface that engages said adjuster rod to move said adjuster rod axially within said central bore.

14. The pneumatic actuator according to claim 11 wherein said rod end mount has a cavity with an inlet port wherein said actuator fitting is coupled to said inlet port and wherein said plunger is received within said cavity between said actuator fitting and said adjuster rod, and wherein said union fitting is directly coupled to said actuator fitting.

15. A vehicle suspension system comprising:
at least one suspension air bag that is pressurized;
at least one suspension component for supporting said at least one suspension air bag;
at least one shock absorber including a main rod that moves axially within said at least one shock absorber, said main rod including a central bore for receiving an adjuster rod; and
a pneumatic actuator fluidly connected to said at least one suspension air bag and including a plunger that moves said adjuster rod within said central bore to adjust damping forces, said pneumatic actuator comprising a plunger having a first end to be actuated by a pressurized air source and a second end, facing opposite said first end, that engages a side surface of said adjuster rod to move said adjuster rod within said central bore, and wherein said second end of said plunger comprises one of a pair of legs engageable within a groove formed within said adjuster rod and a conical tip that slides along said side surface of the adjuster rod.

16. The vehicle suspension system according to claim 15 wherein said at least one shock absorber includes a first rod end mount adapted to be coupled to a vehicle body and a second rod end mount adapted to be coupled to a vehicle wheel, said first rod end mount including a cavity with an inlet port in fluid communication with said at least one suspension air bag wherein said plunger is received within said cavity and wherein an increase in pressure in said at least one suspension air bag results in an increase in air pressure at said inlet port, which moves said adjuster rod to increase damping forces within said at least one shock absorber.

17. The vehicle suspension system according to claim 16 including a fitting fluidly connecting said first rod end mount to said at least one suspension air bag, said fitting including an internal bore defined by an inner diameter, and including a restrictor received within said internal bore and having an outer diameter, and wherein said restrictor defines a reduced flow passage area between said outer diameter and said inner diameter that attenuates air pressure spikes resulting from suspension travel by metering air flow from said at least one suspension air bag to said plunger.

18. The pneumatic actuator according to claim 11 wherein said restrictor comprises a solid plug having a lip that holds said restrictor within said internal bore.

* * * * *

UNITED STATES PATENT AND TRADEMARK OFFICE
CERTIFICATE OF CORRECTION

PATENT NO. : 7,320,387 B2  Page 1 of 1
APPLICATION NO. : 11/100724
DATED : January 22, 2008
INVENTOR(S) : Sendrea It is certified that error appears in the above-identified patent and that said Letters Patent is hereby corrected as shown below:

Claim 11, Column 8, line 26: "alone" should read as --along--

Signed and Sealed this

Tenth Day of June, 2008

JON W. DUDAS
*Director of the United States Patent and Trademark Office*